United States Patent [19]

Higginbotham et al.

[11] 3,857,020

[45] Dec. 24, 1974

[54] AUTOMATIC LINE TRACKER

[75] Inventors: Roy F. Higginbotham; Leland A. Melugin, both of Plantation, Fla.; Donald Carl Hendrickson, deceased, late of St. Petersburg, Fla. by William L. Stanford, administrator

[73] Assignee: Datatype Corporation, Miami, Fla.

[22] Filed: Sept. 28, 1973

[21] Appl. No.: 401,935

[52] U.S. Cl. .......... 235/61.11 E

[51] Int. Cl. .......... G06k 7/10

[58] Field of Search...235/61.11 E, 61.11 D, 61.11 R; 360/82, 101, 109; 250/202, 234, 561, 570

[56] References Cited

UNITED STATES PATENTS

| | | | |
|---|---|---|---|
| 3,471,654 | 10/1969 | Dollenmayer | 360/101 |
| 3,578,337 | 5/1971 | Klein | 360/101 |
| 3,583,709 | 6/1971 | Dollenmayer | 274/4 |
| 3,639,730 | 2/1972 | Higginbotham et al. | 235/61.11 E |
| 3,715,524 | 2/1973 | Adler | 250/570 |

OTHER PUBLICATIONS

IBM Tech. Disc. Bull., "Transport for Optical Mark-Senser Scanner," by Lynott et al., Vol. 12, No. 3, 8/69; pp. 408, 409.

*Primary Examiner*—Stanley M. Urynowicz, Jr.
*Attorney, Agent, or Firm*—Hood & Coffey

[57] ABSTRACT

A system for optically reading a bar code consisting of a plurality of character code groups serially arranged along a transversely extending line on an input media with each code group including a plurality of bit spaces serially arranged along the line, certain of the bit spaces containing longitudinally extending bars. The reading system comprises a scanning head and means for supporting the head for movement along and above the lines, the scanning head carrying a light source for projecting an area of light at the media, a light-responsive semi-conductor device, and optics for projecting light reflected from the media toward the semiconductor device. The support for the scanning head includes a transverse bar which guides the head and which is mounted for shifting movement longitudinally in the direction of extension of the code bars. A drive system for shifting the bar is provided to keep the scanning head above and tracking the line of data. Control circuitry dominates the drive system, the control circuitry being operatively connected between the semiconductor device and the drive system.

23 Claims, 7 Drawing Figures

AUTOMATIC LINE TRACKER

It is a primary object of our invention to provide, in an optical bar code reader, an automatic line tracking system which keeps the optics carrying scanning head above the line even though the line may be skewed.

We refer to the Zappia U.S. Pat. No. 3,600,557 issued Aug. 17, 1971 and the Higginbotham et al. U.S. Pat. No. 3,639,730 issued Feb. 1, 1972. Both of these patents disclose optical bar code readers of the type for which our automatic line tracking system is particularly applicable. In this specification as follows, reference will be made to one or both of the said patents to provide background information for our present invention.

For various reasons, the lines of data on a document to be scanned may be slightly skewed relative to the document and even relative to each other. As clearly described in U.S. Pat. No. 3,600,557, the bar code data to be read may be placed upon sheets of paper by using typewriters which are modified to provide, as well as conventional letters or symbols, a bar code representing the letters or symbols. Preferably, each type carrier or type ball will be modified so that there will be printed below each character (letter or symbol) marks which can be read by optical scanning. Preferably, as fully explained in the said U.S. Pat. No. 3,600,557, the marks will have the shape of one or more rectangular fields or bars. There is sufficient space on conventional type carriers or type balls below the character for providing a series of protruding marks or bars, e.g., short vertical lines and/or rectangular fields of different widths, which, for example, in a seven or eight place binary code system, gives a machine-readable representation. The basic binary recording consists of the presence or absence, respectively, of a vertical line or bar in any one of a number of predetermined positions or bit spaces. Adjacent lines or bars may preferably join one another to form a rectangular field, the width of which will be dependent on the number of lines or bars in that field.

Thus, the preferred bar code consists of a plurality of character code groups serially arranged along a transversely extending line on an input media such as a sheet of white paper. Each code group includes a plurality of bit spaces serially arranged along the line with certain of the bit spaces containing the longitudinally extending bars. It will be appreciated that these longitudinally extending bars have top edges and bottom edges lying, respectively, in common, generally straight lines. It will be appreciated that we have said a generally straight line because the line defined by the bottom edges of the bars may well not be perfectly straight and it may well not be perfectly perpendicular to the marginal edge of the document. For instance, a secretary using the typewriter to produce the optically readable bar code presentation may not get her paper perfectly straight on the platen of the typewriter. The lines she types, therefore, may not be perfectly perpendicular to the left-hand edge of the paper which may be used as a reference for placing the paper in the reader.

Further, after the secretary has typed a few lines on the paper, she may remove the paper for some reason and then reinsert it into the typewriter for typing still more lines. If she does not get the paper in the typewriter the second time exactly the way it was aligned the first time, the second set of lines will be skewed relative to the first set of lines. Heretofore, it has been necessary to accommodate some of this skewing of lines by having the code bars be longitudinally longer. In other words, the height of the code bars has been maintained well above that height necessary to accommodate the scanning concept just because the line itself might be skewed relative to the path of the scanning head.

Our automatic line tracking system incorporates the optics used in the line finding system disclosed in U.S. Pat. No. 3,600,557 and further disclosed in U.S. Pat. No. 3,639,730 to track the line to be scanned. Heretofore, that line finding optics has been used merely to find a longitudinally spaced transversely extending line of data to be scanned on the paper and to stop the longitudinal feed of the paper so that the line will be under the transversely movable scanning head. in accordance with our present invention, we use the line finding optics to track the bottom edges of the bar code to obtain electrical signals necessary controllably longitudinally to shift the guide for the scanning head to keep the scanning head above the line. The particular manner in which we do this will be discussed in detail as this description progresses. However, briefly, our present invention comprises a transverse bar extending along and above the lines to be read and guiding the scanning head and means mounting this bar for shifting movement longitudinally in the direction of extension of the code bars. Drive means for shifting the bar is provided to keep the scanning head above and tracking each line, and control means dominates the drive means, the control means being operatively connected between the output semiconductor device of the line finding optics and the drive means.

In a preferred embodiment of the invention, the means mounting the guide bar for shifting movement includes, at one end of the bar, means about which the bar pivots and, at the other end of the bar, means providing a guideway in which the bar shifts longitudinally, while the drive means includes a motor, cam and spring means. The srping means is disposed yieldably to bias the said other end of the bar in one direction about its pivot axis while the cam is drivingly connected to the motor and arranged to move the said other end in opposition to the spring means. The motor is preferably a bidirectional stepping motor such that each time the motor is energized or pulsed, it will move the cam one angular step position to shift the guide bar one position. The control circuitry includes a counter, which we call a busy counter, providing an output every time a predetermined number of character code groups are scanned. Each time the counter provides an output, we then process the output of the semiconductor device of the line find optics to provide a signal for stepping the shifting motor in one direction or the other.

With our automatic line tracking system, the signal which indicates that a line to be scanned has been found is delayed by delay circuit means, such as adjustable one shots, so that the line find optics will stop on the bottom edges of the line start characters at the beginning end of the line to be read. That is, the small area of light projected by the line find optics onto the input media will stop on the bottom edges of the line start character which corresponds with the bottom edges of the code bars in the line to be scanned.

While the scanning head is moving along a line, the control circuitry, in conjunction with the stepping motor, cam and line find optics, forces the line find optics to track along the bottom edges of the code bars. We prefer to give the step command to the motor once every four character code groups is scanned. Particularly, our busy counter provides a signal every time four such code groups are scanned. The motor is driven to step the optics away from the codes (downwardly), if it has been over the codes during the four character code groups and into the codes (upwardly) if it has not been over the code bars during the four characters. Therefore, when a line is skewed up or down, the optics assembly will follow it, with the line find optics, i.e., the small light area projected by the line find optics, stepping into and out of the code bars.

In accordance with the disclosure of U.S. Pat. No. 3,639,730, the support means for the scanning head includes a cylindrical transversely extending support rod, a bearing block mounted on the support rod for movement therealong as well as about the axis of the rod. The scanning head is mounted on this bearing block for movement therewith. Then, means extends outwardly from the bearing block to engage the said transversely extending guide bar. In other words, movement of the bearing block about the axis of the support rod on which it runs is controlled by longitudinal shifting of the guide bar. As described above, the guide bar is pivoted at one end and longitudinally movable at the other end, that movement being controlled by a cam driven by a stepping motor.

Other objects and features of our present invention will become apparent as this description progresses.

To the attainment of the above and related objects, this invention may be embodied in the forms illustrated in the accompanying drawings, attention being called to the fact, however, that the drawings are illustrative only, and that changes may be made in the specific constructions illustrated and described, so long as the scope of the appended claims is not violated.

Figures 1, 2, 3, 4:
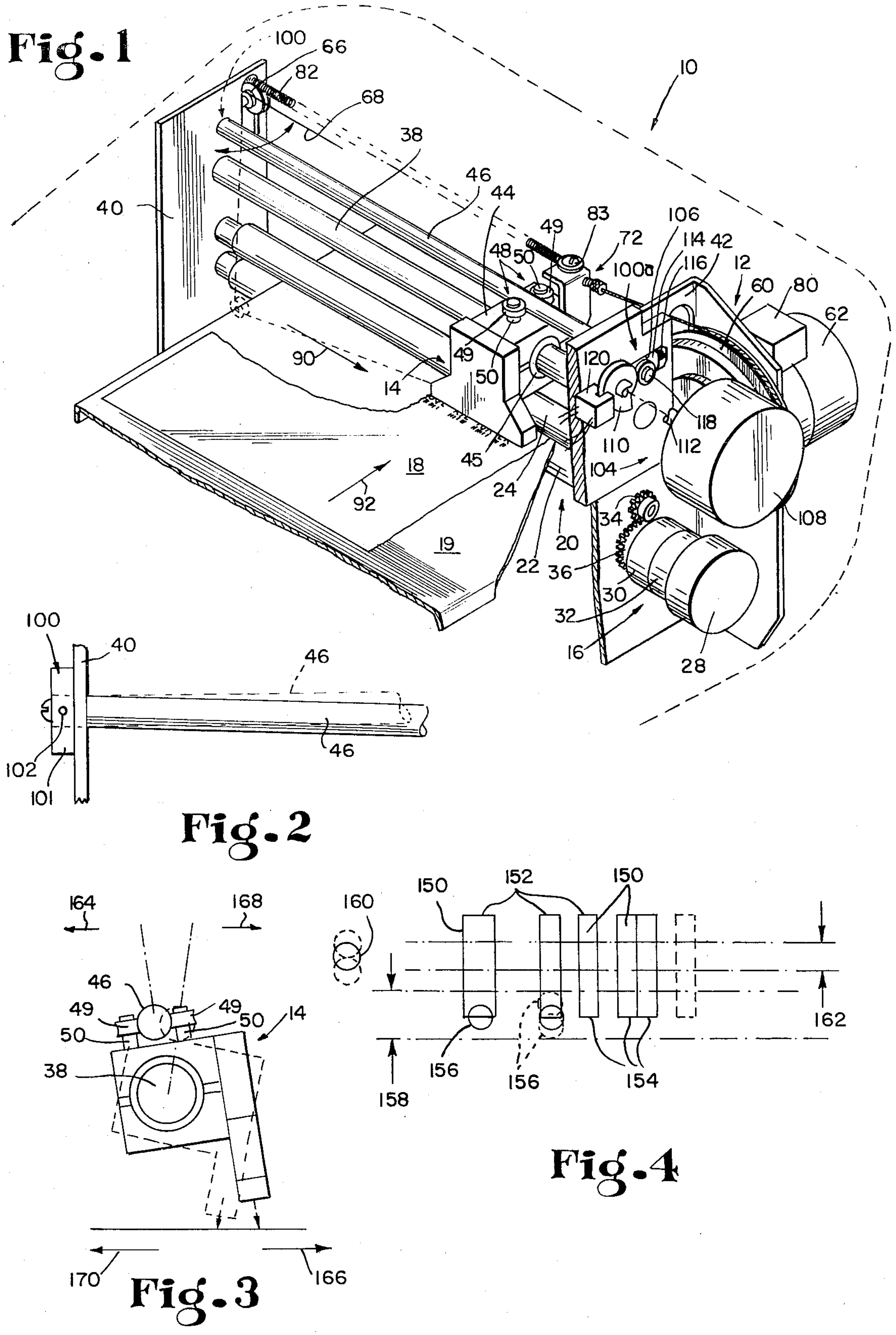
FIG. 1 is a fragmentary perspective view of the related components of an optical reader in accordance with our present invention.
FIG. 2 is a fragmentary view showing the means by which the guide bar is pivotally mounted.
FIG. 3 is an exaggerated diagrammatical view showing how the shifting of the guide bar shifts the optics of the scanning head.
FIG. 4 is an exaggerated diagrammatical view of code bars in a line and the light areas projected by the optics of the scanning head.

Referring now to the drawings, and particularly to FIG. 1, it will be seen that our reader 10 comprises first drive means 12 for reciprocating a transversely movable scanning head 14 and second drive means 16 for feeding a document 18 longitudinally under the path of the scanning head. The document 18 rests on a horizontally extending smooth platform 19. The second drive means 16 includes friction drive roller means 20 for engaging and moving the document 18 longitudinally past the scanning head 14. In the illustrative embodiment, the friction drive roller means 20 includes a journal mounted lower friction roller 22 and a journal mounted upper friction roller 24. The drive means 16 further includes a preferably continuously running constant speed motor 28, electrically operated clutch means 30 and electrically operated brake means 32 associated with the motor. The lower roller 22, in the illustrative embodiment, is drivingly connected to the motor 28 by means such as the illustrative gears 34, 36. The clutch means 30 is effective, when operated, i.e., when energized, drivingly to connect the gear 36, and consequently the lower roller 22, to the rotating output shaft of the motor 28. The brake means 32 is effective, when operated, i.e., when energized, to stop rotation of the gear 36 and, therefore, to stop rotation of the lower roller 22. At the same instant the clutch means 30 is deenergized to disengage the roller 22 from the motor 28, the brake means 32 is energized positively to stop the roller 22 to locate the document 18 at the desired position relative to the scanning head 14.

We provide a cylindrical support rod 38 which extends between a pair of illustrative upstanding brackets 40, 42, which may be the same bracket supporting the roller 22, 24 as illustrated. The axis of the rod 38 is preferably exactly parallel to the axis of the roller 22 and the upper surface of the platform 19. Further, the axis of the rod 38 is parallel to a plane which is perpendicular to the plane of the platform 19 and which includes the axis of the roller 22. We then provide a carriage or bearing block 44 to which the scanning head 14 is fastened for movement therewith, the carriage 44 being mounted on the rod 38 for free movement by means of an antifriction bushing 45. Thus, the carriage 44 is movable about the axis of the rod 38 as well as rectilinearly along the rod 38.

In order to keep the carriage 44 in proper and desired orientation about the axis of the rod 38, we provide a stabilizing rod or guide bar 46 disposed above the rod 38 and extending generally parallel thereto with the exception that the bar 46 is longitudinally controllably shiftable as will be more fully discussed hereinafter. Antifriction means 48 is carried by the carriage 44 and arranged to engage the guide bar 46 such that the longitudinal shifting of the guide bar causes controlled movement of the carriage 44 about the support rod 38 axis. In the illustrative embodiment, the antifriction means 48 includes a pair of roller bearings 49 and a trunnion 50 supporting each of the bearings, the bearings being disposed rollably to engage, respectively, opposite sides of the guide bar 46.

The said first drive means 12 comprises a drive pulley 60 which may be journal mounted on the bracket 42 as illustrated in FIG. 1, a second motor 62 which preferably runs continuously and at a constant speed when the system 10 is energized, and a pair of vertically spaced apart idler rollers 64, 66 journal mounted for free rotation on the bracket 40 as illustrated in FIG. 1. We provide a flexible means 68, which may be a conventional steel wire cable, trained about the pulleys 60, 64, 66. The scanning head 14, i.e., the carriage 44, is fastened to a point on the cable 68 as indicated at 72. We provide a second electrically operated clutch means 80 which is effective, when energized, drivingly to connect the drive pulley 60 to the continuously running motor 62. When the clutch means 80 is energized, the drive pulley 60 is driven in clockwise direction (FIG. 1) to move the scanning head 14 from the left to the right across the top of the document 19. In order to provide a controlled resistance to the pull of the drive pulley 60 as well as means for returning the scanning head 14 to its initial starting position above the left-hand marginal portion of the document 18 when the clutch means 80 is deenergized to release the drive pulley, we provide an elongated coiled tension spring 82 which is connected to the carriage 44 as indicated at 83.

The structure described thus far is completely disclosed in the aforesaid U.S. Pat. No. 3,639,730. The structure comprises first drive means for moving the scanning head 14 transversely as indicated by the arrow 90 and second drive means 16 for feeding the document 18 longitudinally under the scanning head as indicated by the arrow 92. In accordance with the present invention, we provide third drive means for controllably longitudinally shifting the guide bar 46.

We provide means for mounting the guide bar 46 for shifting movement including, at one end of the bar (left-hand end), means 100 about which the bar pivots and, at the other end of the bar, means 100*a*, providing a guide way in which the bar shifts. The means 100 may include, for instance, a block 101 carrying a vertically extending pin 102 about which the bar 46 pivots. The said third drive means, indicated generally by the reference numeral 104, operates at the right-hand end of the bar 46 in the illustrative embodiment. The means 100*a* may include, for instance, a block providing an elongated, horizontally extending slot 106 which guides the end of the bar for shifting movement. The illustrative third drive means 104 comprises a motor 108, a cam 110 mounted on the output shaft of the motor, a slider block 114 disposed in the slot 106, a spring 116 yieldably urging the bar 46 longitudinally in one direction, and a bearing 118 mounted on the end of the bar to act as a cam follower for the cam 110. It will be appreciated that the cam 110 moves the right-hand end of the bar 46 against the urging of the spring 116.

In FIG. 1, we also show what we refer to as a home position optics switch for the cam 110. We prefer that the switch 120 be an infrared switch means including, on one side of the cam, an infrared source and, on the other side of the cam, an infrared responsive semiconductor device. We then place a through opening in the cam which will register with the source and semiconductor device when the cam 110 is in its home position, i.e., when the bar 46 is in its center (nonskew) position from which it can move in either direction. It will be appreciated that other sorts of home position switches may be used to provide an electrical indication when the cam is in its home position.

As clearly detailed in U.S. Pat. No. 3,639,730, the scanning head 14 carries two separate optical systems, one for finding a line of data to be read and the other for reading the line of data. Each optical system includes a light source 134, 136 arranged to project a small area of light at the document 18, a light responsive semiconductor device 138, 140, and optical means 142, 144 for projecting light reflected from the document toward the semiconductor device 138, 140. A discussion of this optical arrangement can be found in the aforesaid Zappia U.S. Pat. No. 3,600,557.

The optical system represented by the light source 134, device 138 and optical means 142 is used to find the line of data to be read while the optical system represented by the light source 136, device 140 and optical means 144 is used to read the line of data. The output of the light-responsive device 140 is fed to signal conditioning circuitry and through that circuitry, to an output device which may be any sort of device for processing electrical signals. As described in the U.S. Pat. Nos. 3,600,557 and 3,639,730, the output of the scanning head may be used for a wide variety of data processing functions and communication functions.

Referring now to the diagrammatical views of FIGS. 3 and 4, it will be seen that we have illustrated the manner in which the light areas projected by the light sources 134, 136 move longitudinally (upwardly and downwardly on the document 18) when the guide bar 46 is shifted. In FIG. 4 we have illustrated code bars 150 serially arranged along a line and having top edges 152 and bottom edges 154. The light source 134 projects a small area of light 156 which, at the beginning end of a line, preferably will be positioned approximately as illustrated on the bottom edge of the first code bar in the line moving left to right. As pointed out in U.S. Pat. No. 3,639,730, it is preferable sometimes to have each line of data to be read begin with a preprinted dark spot. Preferably, the height of these dark spots will be generally the same as the height of the code bars and the bars will be typed so that their top and bottom edges will coincide respectively with the top and bottom edges of the spots. It will be appreciated, however, that the typewriter may be used to place the line start spots or bars at the beginning of each line along the left-hand margin of the document.

The line find light source 134 projects a small area of light 156 (FIG. 4) which is reflected upwardly at the device 138. Preferably, at the beginning end of a line to be scanned, when the cam 110 is in its home position, and the document 18 feed has been properly stopped as will be described hereinafter, the area 156 will fall on the bottom edge of the first bar as shown in FIG. 4. As the scanning head 14 moves along the line, the bar 46 is shifted to keep this area of light 156 generally within the space indicated at 158. The light source 136 projects a small area of light 160 (FIG. 4) which is above the area 156 such that it will be intermediate the ends of the bars, i.e., between the top and bottom edges 152, 154. By making the light area 156 track the bottom edges 154, we keep the light area 160 falling within the space indicated at 162.

In summary to this point concerning the scanning head 14, we arrange the scanning head so that the line find optics projects an area of light slightly below the area projected by the read optics. This can be accomplished mechanically in a number of different ways. One way is to place the optics in different blocks on the carriage 44 and then shim the line find optics approximately 0.045 to 0.060 inch in front of (below) the read optics.

Referring to FIG. 3, it will be seen that when the guide bar 46 is shifted longitudinally in the direction of the arrow 164 (upwardly), the projection of light is shifted downwardly as indicated by the arrow 166. Conversely, when the bar 46 is shifted longitudinally in the direction of the arrow 168 (downwardly) the light projection is shifted upwardly as indicated by the arrow 170. We prefer to use a stepping motor 108 which is bidirectional with four-phases and twelve-poles. This yields us angular steps of 15° per step. The cam 110 is preferably designed to obtain a vertical (longitudinal) optics travel of 0.006 inch per step at the right-most edge of the document 18. The maximum number of steps in each direction from the home position (nonskew position) is 10. Therefore, the absolute maximum vertical distance, i.e., longitudinal in the direction of extension of the code bars, the right-hand end of a line can be skewed up or down is 0.060 inch plus one-half the height of the code bars which may be, for instance, 0.060 inch tall. Thus, in such a configuration, our line tracking system can theoretically accommodate a line which is skewed 0.090 inch. This will, of course, be reduced somewhat because of the poor edge definition at the top and bottom of the code bars.

It is our desire to keep the light area 156 tracking the bottom edges 154 by making the stepping motor 108 drive the cam 110 one step in either direction each time a predetermined number of character code groups are scanned. We have found that it is convenient to make such an adjustment every four character code groups. Our preferred control means is arranged such that the optics will step away from the codes (downwardly) if the light area 156 has been over the code bars during the last four character code groups, and into the code bars if it has not been over the code bars during the last four character code groups. Particularly, our control means operates the third drive means 104 to project the light area 156 upwardly when it is falling primarily below the bottom edges of the code bars and downwardly when it is falling primarily above the bottom edges and upon the bars. In other words, very advantageously, our control means includes counter means for providing an output signal every time a predetermined number of code groups are scanned, which output signal is used to initiate a command for stepping the third drive means 104.

Further, we have included delay circuitry in the control between the line finding optics and the second drive means 16 (document feed drive) to delay stopping of the document until the area of light 156 is on the bottom edges 154. We have found that it is suitable to use adjustable one shots to delay stopping the drive means 16 until the light area 156 moves from the top edges 152 to the bottom edges 154. Adjustable one shots are well known in data processing logic circuitry.

Figure 6:
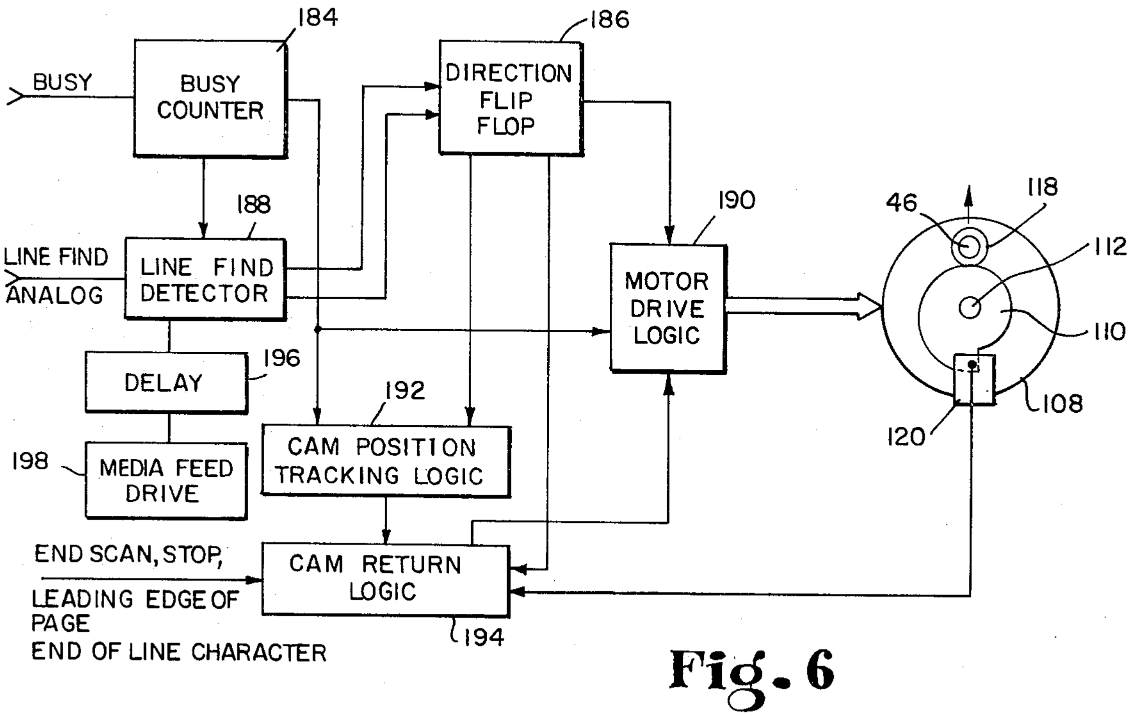
FIG. 6 is a more detailed block diagram of a portion of the system shown in FIG. 5.
Figures 5, 7:
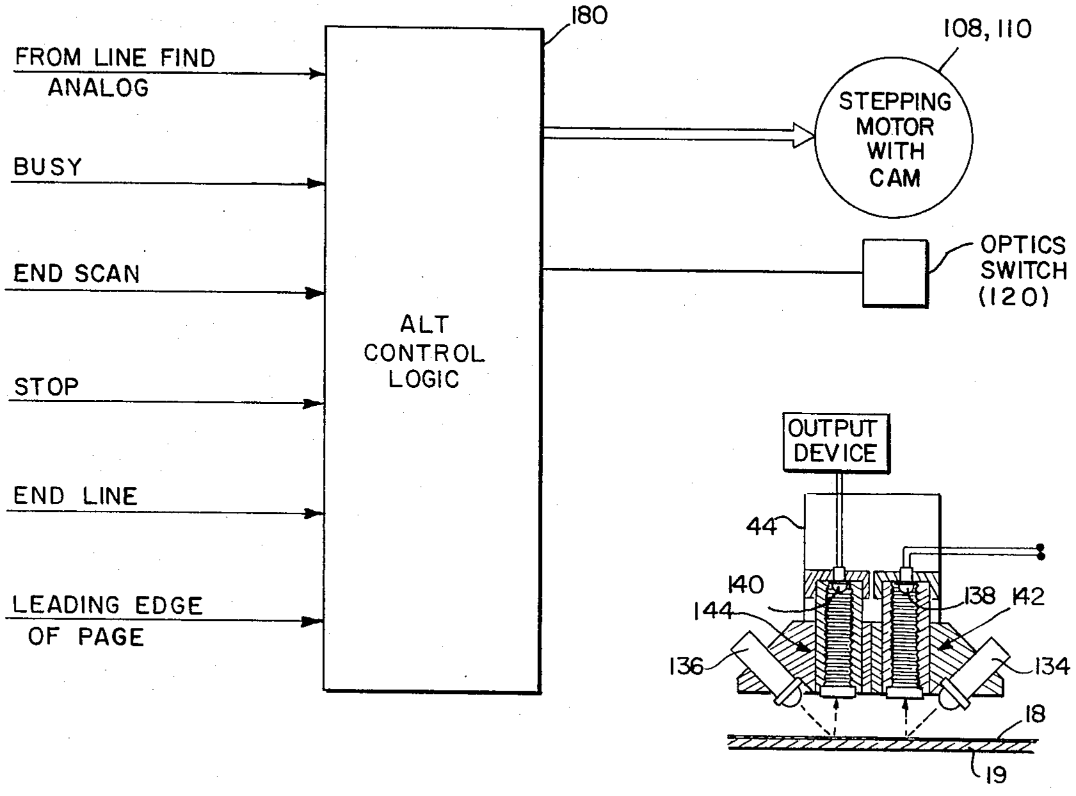
FIG. 5 is a block diagram of the control circuitry we prefer to use.
FIG. 7 is a fragmentary sectional view, somewhat diagrammatic, showing the optics of the scanning head.

Turning to FIGS. 5 and 6, it will be seen that we have shown several inputs to the Automatic Line Tracking (ALT) control logic block indicated at 180. Each of the inputs is identified on the drawing for convenience. The various inputs, with the exception of the "BUSY" and the input from the optic switch 120 are discussed in the aforesaid U.S. Pat. Nos. 3,600,557 and 3,639,730.

It will be appreciated that various types of control circuits may be used to cause the motor 108 to step in one direction when the light area 156 is falling primarily below the bottom edges and in the opposite direction when the light area 156 is falling primarily above the bottom edges 154. Such logic control circuitry is well within the skill of circuit designers once the various inputs and desired outputs are identified. In FIG. 6, we show in more detailed block diagram form how the various inputs are used to control the motor 108. There are a busy counter 184, direction flip-flop 186, line find detector 188, motor drive logic 190, cam position tracking logic 192, cam return logic 194, a delay circuit 196, and the media feed drive circuitry 198 shown in FIG. 6.

The busy counter 184 provides an output signal every four character code groups to the line find detector 188 and the cam position tracking logic 192. The direction flip-flop 186, which may be a set-reset flip-flop which is set or reset by the line find detector 188, changes state upon receiving impulses from the line find detector. If the light area 156 is over black, i.e., over the code bars, the flip-flop 186 will be set to pivot the optics downwardly. If the light area is over white, i.e., below the bottom edges 154, or primarily below the bottom edges, the flip-flop will be set to pivot the optics upwardly. If the line find detector 188 repeats itself and reports that the light area is still either over white or over black, the direction of the motor 108 does not change, but the cam 110 is advanced one more step in an attempt to get the desired change. In this manner, the scanning head is shifted to accommodate line skewing.

The direction flip-flop 186 feeds the motor drive logic 190, the cam position tracking logic 192 and the cam return logic 194.

The cam position tracking logic 192 keeps track of the position of the cam 110 by counting the steps of the cam. The cam position tracking logic is fed by the busy counter as mentioned above.

The cam return logic 194 contains a high-speed oscillator that causes the cam 110 to return to its home position swiftly at the end of a line because it is desirable, of course, to have the cam start out in its home position at the beginning of each line. This is why we have the optic switch 120 feeding the cam return logic as well as the other illustrated inputs to the cam return logic. The output of the cam return logic is fed to the motor drive logic 190. The motor drive logic 190 is fed by the busy counter 184 and then drives the motor 108 in the direction determined by the direction flip-flop 186.

The delay circuitry 196 includes the adjustable one shots as discussed previously. The block 198 labeled "MEDIA FEED DRIVE" is representative of the aforesaid second drive means 16.

We claim:

1. Means for optically reading a bar code consisting of a plurality of character code groups serially arranged along a transversely extending line on an input media, each code group including a plurality of bit spaces serially arranged along the line with certain of said bit spaces containing longitudinally extending bars, said reading means comprising a scanning head and means for supporting said head for movement along and above the line, said scanning head carrying light source means for projecting light at the media, a light-responsive semiconductor device, and optical means for projecting light reflected from the media toward said semiconductor device, whereby the presence and amount of light on said device depends upon the presence or absence and position of said code bars, said support means including a transverse bar extending along and above such a line and guiding said head, means mounting said bar for shifting movement longitudinally in the direction of extension of such code bars, drive means for shifting said bar to keep said scanning head above and tracking said line, and control means dominating said drive means, said control means being operatively connected between said semiconductor device and said drive means.

2. The invention of claim 1 in which said means mounting said bar for shifting movement includes, at one end of said bar, means about which said bar pivots and, at the other end of said bar, means providing a guide way in which said bar shifts, said drive means including a motor, cam, and spring means, said spring means being disposed yieldably to bias said other end of said bar in one direction about said pivot means, said cam being drivingly connected to said motor and arranged to move said other end in opposition to said spring means.

3. The invention of claim 1 in which said support means includes a cylindrical transversely extending support rod, a bearing block mounted on said rod for movement therealong as well as about the axis of said rod, said scanning head being mounted on said bearing block for movement therewith, means for engaging said bar, said engaging means being carried by said block and effective to move said block about the axis of said support rod when said bar is shifted by said drive means.

4. The invention of claim 2 in which said support means includes a cylindrical transversely extending support rod, a bearing block mounted on said rod for movement therealong as well as about the axis of said rod, said scanning head being mounted on said bearing block for movement therewith, means for engaging said bar, said engaging means being carried by said block and effective to move said block about the axis of said support rod when said bar is shifted by said drive means.

5. The invention of claim 2 in which said motor is a bidirectional stepper motor having an output shaft, said cam being mounted on said output shaft and having a home starting position, said motor being effective to drive said cam a predetermined angular amount each time it is energized by said control means.

6. The invention of claim 5 in which said control means includes switch means for providing an electrical signal defining said home position of said cam.

7. The invention of claim 6 in which said scanning head is positioned and directed to project an area of light at the lower edges of the bars when said scanning head is at the beginning end of a line to be scanned and said cam is in its said home position, said control means including counter means for providing an output signal every time a predetermined number of code groups are scanned, and circuit means for operating said drive means to project said light area upwardly when it is falling primarily below the bottom edges of the bars and downwardly when it is falling primarily above the bottom edges and upon the bars, whereby said area of light tracks such bottom edges, said circuit means being operatively connected to said semiconductor device and said counter means such that said circuit means provides an output to operate said drive means each time said counter means provides an output signal.

8. The invention of claim 1 in which said scanning head is positioned and directed to project an area of light at the lower edges of the bars when said scanning head is at the beginning end of a line to be scanned, said control means including circuit means for operating said drive means, as the line is scanned, to project said light area upwardly when it is falling primarily below the bottom edges of the bars and downwardly when it is falling primarily above the bottom edges and upon the bars, said circuit means being operatively connected to and dominated by said semiconductor device.

9. The invention of claim 8 in which said control means includes counter means for providing an output signal every time a predetermined number of code groups are scanned, said circuit means being operatively connected to and responsive to said counter means to provide an output signal to operate said drive means each time said counter provides an output signal.

10. The invention of claim 9 in which said means mounting said bar for shifting movement includes, at one end of said bar, means about which said bar pivots and, at the other end of said bar, means providing a guide way in which said bar shifts, and drive means including a motor, cam, and spring means, said spring means being disposed yieldably to bias said other end of said bar in one direction about said pivot means, said cam being drivingly connected to said motor and arranged to move said other end in opposition to said spring means.

11. The invention of claim 10 in which said support means includes a cylindrical transversely extending support rod, a bearing block mounted on said rod for movement therealong as well as about the axis of said rod, said scanning head being mounted on said bearing block for movement therewith, means for engaging said bar, said engaging means being carried by said block and effective to move said block about the axis of said support rod when said bar is shifted by said drive means.

12. The invention of claim 11 in which said motor is a bidirectional stepper motor having an output shaft, said cam being mounted on said output shaft and having a home starting position, said motor being effective to drive said cam a predetermined angular amount each time it is energized by said control means.

13. The invention of claim 12 in which said control means include switch means for providing an electrical signal defining said home position of said cam.

14. A system for optically reading bar code data consisting of a plurality of character code groups serially arranged along longitudinally spaced apart, transversely extending lines of data on an input media with each code group including a plurality of bit spaces serially arranged along one of such lines with certain of said spaces containing longitudinally extending bars, said system comprising a scanning head and means for supporting said scanning head for movement transversely along and above each line, first drive means for moving said scanning head along said support means, second drive means for moving said input media longitudinally relative to said scanning head to present lines of data to be scanned, said scanning head carrying first and second light source means for projecting light at the media, first and second light-responsive semiconductor devices, and first and second optical means for projecting light reflected from the media respectively toward said first and second semiconductor devices, an output device, first circuit means for operatively connecting said first semiconductor device to said output device, said support means including a transverse bar extending along and above such a line and guiding said head, means mounting said bar for shifting movement longitudinally in the direction of extension of such code bars, third drive means for shifting said bar to keep said scanning head above and tracking said line, and control means dominating said third drive means, said control means being operatively connected between said second semiconductor device and said third drive means.

15. The invention of claim 14 in which said means mounting said bar for shifting movement includes, at one end of said bar, means about which said bar pivots and, at the other end of said bar, means providing a guide way in which said bar shifts, said third drive means including a motor, cam, and spring means, said spring means being disposed yieldably to bias said other end of said bar in one direction about said pivot means, said cam being drivingly connected to said motor and arranged to move said other end in opposition to said spring means.

16. The invention of claim 15 in which said support means includes a cylindrical transversely extending support rod, a bearing block mounted on said rod for movement therealong as well as about the axis of said rod, said scanning head being mounted on said bearing block for movement therewith, means for engaging said bar, said engaging means being carried by said block and effective to move said block about the axis of said support rod when said bar is shifted by said third drive means.

17. The invention of claim 16 in which said motor is a bidirectional stepper motor having an output shaft, said cam being mounted on said output shaft and having a home starting position, said motor being effective to drive said cam a predetermined angular amount each time it is energized by said control means.

18. The invention of claim 17 in which said control means includes switch means for providing an electrical signal defining said home position of said cam.

19. The invention of claim 18 in which said scanning head is positioned and directed so that said first light source means projects a first area of light intermediate the ends of the bars and said second light source means projects a second area of light at the lower edges of the bars when said scanning head is at the beginning end of a line to be scanned and said cam is in its said home position, said control means including counter means for providing an output signal every time a predetermined number of code groups are scanned, and a control circuit for operating said third drive means to project said second light area upwardly when it is falling primarily below the bottom edges of the bars and downwardly when it is falling primarily above the bottom edges and upon the bars, whereby said second area of light tracks such bottom edges, said control circuit being operatively connected to said second semiconductor device and said counter means such that said control circuit provides an output to operate said third drive means each time said counter means provides an output signal.

20. The invention of claim 14 in which said scanning head is positioned and directed so that said first light source means projects a first area of light intermediate the ends of the bars and said second light source means projects a second area of light at the lower edges of the bars when said scanning head is at the beginning end of a line to be scanned, said control means including a control circuit for operating said third drive means to project said second light area upwardly when it is falling primarily below the bottom edges of the bars and downwardly when it is falling primarily above the bottom edges and upon the bars, said control circuit being operatively connected to and dominated by said second semiconductor device.

21. The invention of claim 20 in which said control means includes counter means for providing an output signal every time a predetermined number of code groups are scanned, said control circuit being operatively connected to and responsive to said counter means to provide an output signal to operate said third drive means each time said counter means provides an output signal.

22. The invention of claim 20 including feed control circuit means operatively connecting said second drive means to said second semiconductor device to start and stop the longitudinal feed movement of the media, said feed control circuit means being responsive to said second semiconductor device to stop the longitudinal feed when the scanning head is over a line to be scanned as sensed by said semiconductor device, said control circuit means including delay circuitry means for delaying the stopping of the longitudinal feed until the second light area is over the bottom edges of the bars.

23. The invention of claim 14 in which said scanning head is positioned and directed so that said first light source means projects a first area of light intermediate the ends of the bars and said second light source means projects a second area of light at the lower edges of the bars when said scanning head is at the beginning end of a line to be scanned, and including feed control circuit means operatively connecting said second drive means to said second semiconductor device to start and stop the longitudinal feed movement of the media, said feed control circuit means being responsive to said second semiconductor device to stop the longitudinal feed when the scanning head is over a line to be scanned as sensed by said second semiconductor device, said control circuit means including delay circuitry means for delaying the stopping of the longitudinal feed until the second light area is over the bottom edges of the bars.

* * * * *

UNITED STATES PATENT OFFICE
CERTIFICATE OF CORRECTION

PATENT NO. : 3,857,020

DATED : December 24, 1974

INVENTOR(S) : Roy F. Higginbotham, et als.

It is certified that error appears in the above-identified patent and that said Letters Patent are hereby corrected as shown below:

Column 2, line 15, "in" should be -- In --; line 39, "spring" is misspelled.

Column 10, line 2, (Claim 9, line 7), after "counter" insert -- means --; line 8, (Claim 10, line 5), "and" should be -- said --.

Signed and sealed this 6th day of May 1975.

(SEAL)
Attest:

RUTH C. MASON
Attesting Officer

C. MARSHALL DANN
Commissioner of Patents
and Trademarks